(12) United States Patent
Manley et al.

(10) Patent No.: US 9,191,323 B2
(45) Date of Patent: Nov. 17, 2015

(54) ADAPTIVE DATA TRANSMISSION

(75) Inventors: Stephen Manley, Livermore, CA (US); Laurent Pautet, Rillieux la Pape (FR); Prasanna Kumar Malaiyandi, San Jose, CA (US)

(73) Assignee: TIBCO Software Inc., Palo Alto, CA (US)

( * ) Notice: Subject to any disclaimer, the term of this patent is extended or adjusted under 35 U.S.C. 154(b) by 553 days.

(21) Appl. No.: 13/225,147

(22) Filed: Sep. 2, 2011

(65) Prior Publication Data

US 2012/0089568 A1     Apr. 12, 2012

Related U.S. Application Data

(60) Provisional application No. 61/380,156, filed on Sep. 3, 2010.

(51) Int. Cl.
*G06F 17/30* (2006.01)
*H04L 12/801* (2013.01)
*H04L 12/861* (2013.01)

(52) U.S. Cl.
CPC .......... *H04L 47/10* (2013.01); *G06F 17/30067* (2013.01); *H04L 49/9005* (2013.01)

(58) Field of Classification Search
CPC . H04L 47/10; H04L 41/0896; H04L 43/0894; H04L 43/16; H04L 47/822; H04L 49/9005; G06F 17/30067
USPC .......................................................... 707/634
See application file for complete search history.

(56) References Cited

U.S. PATENT DOCUMENTS

| 7,751,316 | B2* | 7/2010 | Yarlagadda ....... H04L 29/06027 370/230 |
| 8,254,399 | B1* | 8/2012 | Wang et al. .................... 370/401 |
| 8,578,393 | B1* | 11/2013 | Fisher et al. ................... 719/313 |
| 2005/0114708 | A1 | 5/2005 | DeStefano et al. |
| 2007/0217448 | A1* | 9/2007 | Luo ......................... H04L 47/10 370/468 |
| 2008/0172441 | A1* | 7/2008 | Speicher et al. .............. 709/201 |

(Continued)

FOREIGN PATENT DOCUMENTS

| WO | 2009046101 | 4/2009 |
| WO | WO 2009/046101 | 4/2009 |

OTHER PUBLICATIONS

Forte, Dario., "The State of the Art in Digital Forensics", REFEREX, vol. Advances in Computers, Technology, No. 67, Jan. 1, 2006, pp. 253-300.

(Continued)

*Primary Examiner* — Tony Mahmoudi
*Assistant Examiner* — Merilyn Nguyen
(74) *Attorney, Agent, or Firm* — Fish & Richardson P.C.

(57) ABSTRACT

Methods, program products, and systems implementing adaptive data transmission are disclosed. A universal data collector can act as an intermediary between a log producer and a log processor. The universal data collector can be connected to the log producer through a first, reliable network. The universal data collector can be connected to the log processor through a second, less reliable network. The universal data collector can perform a multi-phase commit of data to ensure that the log data are saved by the log processor. The universal data collector can smooth the data transmission from the universal data collector to the log processor through a network, including adaptively buffering the log data according to available network bandwidth of the network.

20 Claims, 10 Drawing Sheets

(56) References Cited

U.S. PATENT DOCUMENTS

| | | | |
|---|---|---|---|
| 2008/0175145 A1 | 7/2008 | Clemm et al. | |
| 2008/0239955 A1 | 10/2008 | Chang et al. | |
| 2008/0279183 A1* | 11/2008 | Wiley et al. | 370/389 |
| 2010/0011031 A1 | 1/2010 | Huang et al. | |

OTHER PUBLICATIONS

Guanling, et al., "Policy-Driven Data Dissemination for Context-Aware Applications", Pervasive Computing and Communications, 2005. Percom 2005. Third IEEE International Conference on Kauai Island, HI, USA Mar. 8-12, 2005, Piscataway, NJ, USA, IEEE, Mar. 8, 2005, pp. 283-289.

PCT Notification of Transmittal of the International Search Report and the Written Opinion of the International Searching Authority, or the Declaration for Application No. PCT/US2011/050386, Mailed Nov. 28, 2011, 11 pages.

PCT Notification of International Preliminary Report on Patentability for International Patent Application No. PCT/US2011/050386, Filed Sep. 2, 2011. 9 pages.

* cited by examiner

ADAPTIVE DATA TRANSMISSION

CROSS REFERENCE TO RELATED APPLICATION

This application claims the benefit under 35 U.S.C. §119(e) of U.S. Patent Application No. 61/380,156, filed Sep. 3, 2010, entitled "Adaptive Data Transmission," which is incorporated by reference herein in its entirety.

TECHNICAL FIELD

This disclosure relates generally to managing log data

BACKGROUND

A large organization often can have multiple smaller, remote facilities. At each of the facilities, multiple devices can produce a variety of log data. For example, a satellite office of a company can maintain multiple log sources. Log sources can include devices and applications, including web servers, email servers, routers, firewalls and communication gateways. Each of the log sources can produce log data, which can include one or more records relating to actions of the log source. These log data can be transmitted to one or more central processing servers using various log protocols.

An exemplary logging protocol is Syslog (Internet Engineering Task Force (IETF) proposed standard request for comment (RFC) 5424). Syslog allows separation of a log source that generates log data from a system that stores the log data and a system that reports and analyzes the log data. Syslog can transfer data using the user datagram protocol (UDP) or transmission control protocol (TCP). Today, Syslog does not guarantee reliable storage of the log data. In addition, Syslog does not provide a standard way of managing a wide area network (WAN) that connects a log source and the central processing server. The WAN can be slow, loss-prone, insecure, and potentially overloaded.

SUMMARY

Methods, program products, and systems implementing adaptive data transmission are disclosed. A universal data collector can act as an intermediary between a log producer and a log processor. The universal data collector can be connected to the log producer through a first network. The universal data collector can be connected to the log processor through a second network that is less reliable than the first network. The universal data collector can perform a multi-phase commit of data received from the log producer, including requiring an acknowledgement from the log processor that can confirm that the committed data are saved, while the universal data collector transmits other log data to the log processor. The universal data collector can smooth the data transmission from the universal data collector to the log processor through a network (e.g., a WAN), including adaptively buffering the log data according to available network bandwidth of the network.

Adaptive data transmission techniques can be utilized to achieve one or more of the following advantages. The two-phase commit can make data communication more reliable. Instead of simply send-and-forget log data (e.g., by using syslog UDP) or waiting for acknowledgement of receipt (e.g., syslog TCP), a universal data collector can wait for an acknowledgment that the log data has been committed to a stable storage. The adaptive data transmission techniques can allow a delayed acknowledgement of log data, such that the transmission of data can be pipelined. Pipelining data can be advantageous for a network (e.g., a WAN) that has a long latency time because data transmission and receipt confirmation can occur asynchronously.

The network smoothing aspects of the adaptive data transmission techniques allows for efficient use of available network resources. Instead of creating backpressure on a log producer (e.g., by using syslog TCP) or transmitting log data at scheduled intervals (e.g., by using file transfer protocol (FTP)), a universal data collector can deliver a smooth stream of live log data. When possible, the universal data collector can transmit live log data to a log processor. When network constraints exist, for example, when a stream of live log data exceeds an available network bandwidth or when a network outage occurs, the universal data collector can send as much log data as possible and buffer the remainder. When the bandwidth is more available, the universal data collector can transmit the log data over to the log processor faster. These techniques allow the universal data collector to the limit effect of network bandwidth constraints on the timeliness of transmission of the log data by delivering the log data to log data processing devices as quickly and efficiently as possible.

The versioning protocol used in adaptive data transmission can support a variety of protocol options including compression, encryption, and scheduled transfer. In a distributed environment, a large company having numerous log sources can avoid the complexity of trying to keep all software on all log sources in synchronization. For example, a universal data collector can be individually updated. The adaptive data transmission can use versioned protocols and enable negotiation between two components. The negotiation can result in a feature being enabled for both components. Accordingly, the large company can leverage the greatest common factor of options between components, rather than the least common denominator, and upgrade any component of an information technology (IT) infrastructure as necessary.

The details of one or more implementations of adaptive data transmission techniques are set forth in the accompanying drawings and the description below. Other features, aspects, and advantages of adaptive data transmission will become apparent from the description, the drawings, and the claims

DETAILED DESCRIPTION

Adaptive Data Transmission Overview

Figure 1:
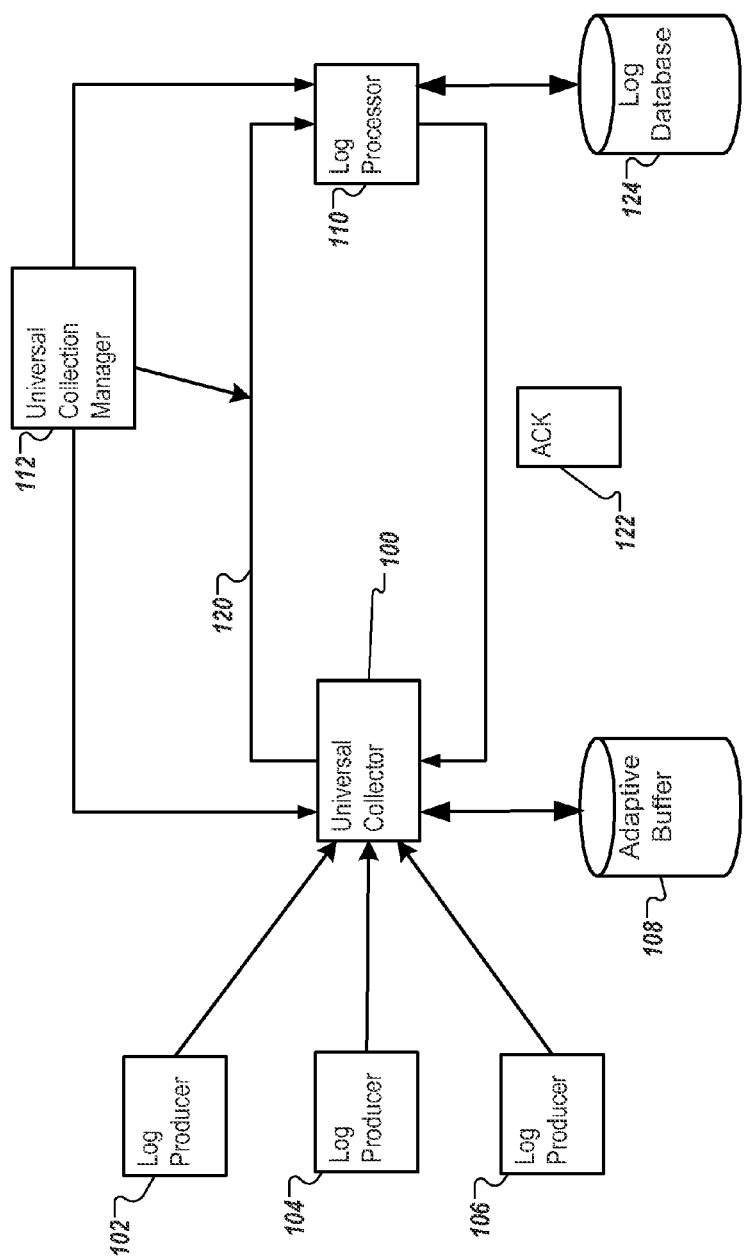
FIG. 1 provides an overview of adaptive data transmission.

FIG. 1 provides an overview of adaptive data transmission. Adaptive data transmission techniques can be implemented using a universal collection framework (UCF) including one or more log producers 102, 104, and 106, universal data collector 100, and log processor 110.

Universal data collector 100 can act as an intermediary between log producers 102, 104, and 106 and log processor 110. Universal data collector 100 can transmit log data produced from log producers 102, 104, and 106 to log processor 110 using multi-phase commit. The log data can be committed to universal data collector 100 in a first phase, and to log processor 110 in a second phase.

Log producers 102, 104, and 106 can include computer instructions that are configured to gather various log data from a log source and send the gathered log data for processing. The log source can include a log-producing device, an operating system, or an application. A log producing device, operating system, or application can correspond to multiple log producers. For example, a web server device can include one or more system log producers producing operating system log data and one or more web server log producers producing web server log data.

Universal data collector 100 can receive log data produced from log producers 102, 104, and 106 through a first network. The first network can be a trusted network such as a local area network (LAN), where data transmission is secure, reliable, and fast. In some implementations, universal data collector 100 can be implemented on a log source. For example, universal data collector 100 and log producer 106 can be integrated as a log agent and be stored locally on a disk of a web server computer that produces various log data. Thus, receiving the log data can include receiving local log data. In real time, universal data collector 100 can transmit the received log data to log processor 110. Log processor 110 can include hardware and software for parsing, storing, and analyzing the log data.

Universal data collector 100 can transmit the collected log data through a second network. The second network can be a network that is less secure, reliable, or fast than the first network. Upon receiving the log data from universal data collector 100, log processor 110 can store the received log data into log database 124 for further processing. Upon successful saving of the received log data, log processor 110 can send acknowledgement 122 back to universal data collector 100.

The log data produced by log producers 102, 104, and 106 can include one or more log records. Each log record can correspond to an event happening at or recorded by a log producer (e.g., a web server error event). The event can correspond to an event time indicating when the event has occurred. Universal data collector 100 transmits log data in real time to log processor 110 to preserve the event time of each record, including transmitting a log data record or a set of log data records to log processor 110 as soon as universal data collector 100 receives the log data record or set of log data records. Universal data collector 100 can transmit a next received log data record or next set of log data records without waiting for an acknowledgement from log processor 110.

Universal data collector 100 can store log data in adaptive buffer 108. Log data stored in adaptive buffer 108 can include the log data records that have been transmitted to log processor 110 but for which an acknowledgment has not been received. Universal data collector 100 may not receive acknowledgement 122 due to network latency, when an error occurs at the second network, at log processor 110, or at log database 124, or due to other reasons. If an acknowledgment for a particular log data record or set of log data records is not received for a specified threshold amount of time, universal data collector 100 can determine that the log data record or set of log data records is lost. Universal data collector 100 can resend the log data record or set of log data records. If an acknowledgement is received, universal data collector 100 can remove the log data record or set of log data records from adaptive buffer 108.

In some implementations, universal data collector 100 can adaptively transmit the log data according to available network bandwidth of the second network connecting universal data collector 100 and log processor 110. Universal data collector 100 can receive a large volume of log data from log producers 102, 104, and 106. Due to available network bandwidth limitations, sending the large volume of log data to log processor 110 in real-time may not be possible. Universal data collector 100 can store the log data that cannot be transmitted in real-time in adaptive buffer 108, and transmit the stored log data to log processor 110 when extra network bandwidth becomes available or when a volume of log data received from log producers 102, 104, and 106 drops.

In some implementations, universal data collector 100 can negotiate with log producers 102, 104, and 106 and log processor 110 such that even when log producers 102, 104, and 106 and log processor 110 includes different versions of log processing software, communication between log producers 102, 104, and 106 and log processor 110 can still occur smoothly.

The UCF can optionally include universal collection manager 112. Universal collection manager 112 can monitor conditions of various components of the UCF including universal data collector 100, log processor 110, and traffic 120 of transmitting log data from universal data collector 100 to log processor 110. If performance of a component falls below or above a threshold, universal collection manager 112 can configure the component or another component to adapt to the condition. For example, if universal collection manager 112 detects that traffic 120 has been utilizing full available bandwidth for a period of time, universal collection manager 112 can instruct universal data collector 100 to increase a buffer size of adaptive buffer 108 in anticipation of more buffing requirement. If universal collection manager 112 detects that log processor 110 is unable to send acknowledgements in a prompt manner, universal collection manager 112 can configure log processor 110 to allocate more resources (e.g., memory, CPU time, or storage space) to process log data transmitted from universal data collector 100.

Exemplary Network Smoothing

Figure 2A:
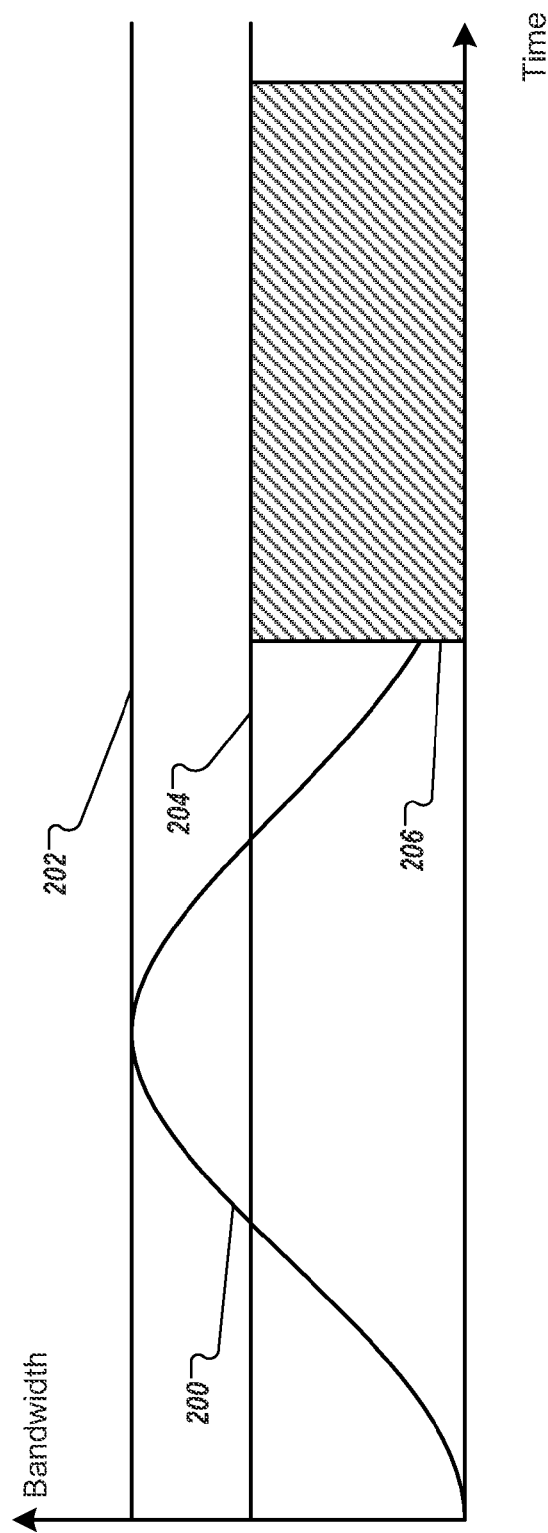
FIGS. 2A and 2B are graphs illustrating exemplary implementations of adaptive data transmission techniques subject to available network bandwidth limitation.
Figure 2B:
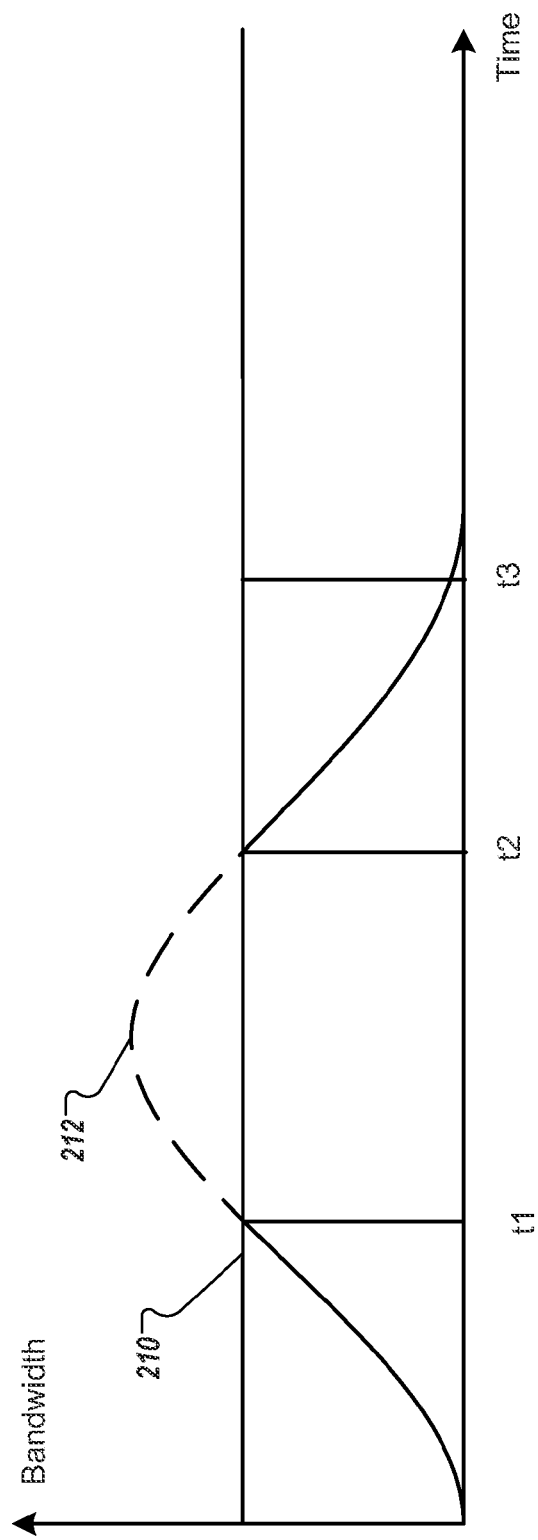

FIGS. 2A and 2B are graphs illustrating exemplary implementations of adaptive data transmission techniques subject to available network bandwidth limitation. FIG. 2A is a graph illustrating a network bandwidth constraint. A universal data collector can receive log data from log producers at various time of day or week. A rate at which log data is received can vary based on time. Exemplary curve 200 indicates a pattern of log data production and reception. Usage patterns of log sources can vary based on time. The log data production and reception can reach peaks at certain times of day, and troughs at other times of the day.

To transmit the log data live to a log processor, the universal data collector may need network bandwidth 202 that can satisfy the transmission demand at the peak. This can be wasteful because at other times of the day, network bandwidth 202 may be fully utilized.

Network bandwidth 204, which is less than network bandwidth 202, may be available to the universal data collector 100. To transmit all log data to log processor 110 under network bandwidth 204, the universal data collector 100 can cache the received log data (e.g., in a file) and transmit the file to the log processor 110 using a configurable schedule, for example, at time when the rate of receiving log data is low, e.g., at period 206. The universal data collector 100 can transmit the data using available network bandwidth 204. However, scheduled transmission of log data can cause loss of information that has real-time importance. For example, a log record indicating a server down event that occurs at 9:00 am may not be transmitted to the log processor 110 until the scheduled time, which can be 8:00 pm.

FIG. 2B is a graph illustrating adaptive data transmission subject to available network bandwidth. The universal data collector 100 can receive log data subject to pattern 212. Available network bandwidth 210 is insufficient to allow the universal data collector 100 to transmit all received log data to the log processor 110 in real-time, during period from time t1 to time t2. The universal data collector 100 can include a control component that, upon detecting the insufficiency at time t1, automatically switches the universal data collector 100 from a live transmission mode to a store-and-forward transmission mode. In the store-and-forward transmission mode, the universal data collector 100 can buffer the log data that cannot be transmitted, and transfer the buffered data when additional network bandwidth becomes available. For example, at time t2, the control component can detect that available network bandwidth 210 permits transmission of buffered log data, due to a drop in total volume of log data received. The control component can automatically switch the universal data collector 100 from the store-and-forward transmission mode to a live transmission mode. Meanwhile, the universal data collector 100 can transmit the buffered log data in addition to the real time log data received at the universal data collector 100, utilizing available network bandwidth 210. At time t3, all the buffered log data are transmitted to a log processor 110. The universal data collector 100 can continue transmitting received log data in real-time.

Exemplary Multi-Phase Data Commit

Figure 3:
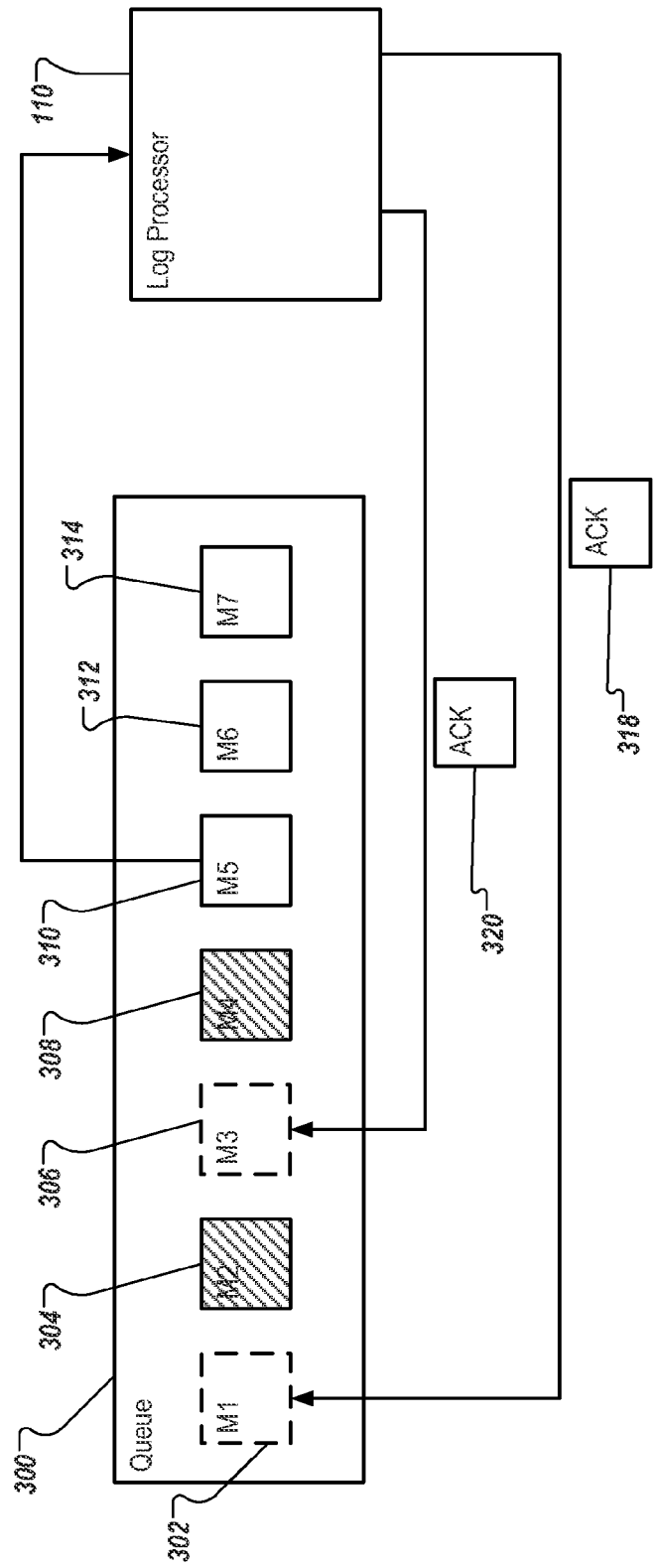
FIG. 3 is a block diagram illustrating exemplary multi-phase data commit in adaptive data transmission.

FIG. 3 is a block diagram illustrating exemplary multi-phase data commit in adaptive data transmission. The multi-phase data commit techniques can provide reliable and asynchronous transmission of log data. The universal data collector 100 can include an adaptive data buffer that can store queue 300 that includes, at various time, units 302, 304, 306, 308, 310, 312, and 314 of log data. Each unit can include one or more log records. As the universal data collector 100 receives log data, the universal data collector 100 can organize the received log data into units and enter the units into queue 300. The universal data collector 100 can transmit the units of log data to the log processor 110 through a communications network (e.g., a WAN). The transmission can occur sequentially. The transmission can be real-time. In real-time transmission, queue 300 can include zero or one unit of log data. Due to network latency and/or slow processing of log processor 110, queue 300 can include multiple units of log data.

At a given time, as illustrated in FIG. 3, the universal data collector 100 has transmitted units 302, 304, 306, and 308 of log data to log processor 110. The universal data collector 100 can proceed to transmit unit 310 of log data to the log processor 110. The universal data collector 100 has received acknowledgements 318 and 320 from the log processor 110. Acknowledgements 318 and 320 can indicate that the log processor 110 has committed units 302 and 306, respectively, to a storage device. Upon receiving acknowledgments 318 and 320, the universal data collector 100 can remove acknowledgments 318 and 320 from queue 300.

The universal data collector has not received acknowledgments for units 304 and 308 from log processor 110. The universal data collector 100 can proceed to transmit unit 310 of log data in queue 300 without first receiving all acknowledgments of transmitted units of log data.

The universal data collector 100 can re-transmit units 304 and 308 of log data to the log processor 110 if, after a specified threshold length of time, acknowledgments that the log processor 110 confirming that units 304 and 308 of log data have been committed has not been received. Re-transmitting units 304 and 308 of log data can occur concurrently (e.g., in parallel) with transmission of units 312 and 314 of log data, which can enter queue 300 upon being received by the universal data collector 100. The re-transmission can occur before the transmission of units 312 and 314 of log data, or after the transmission of units 312 and 314 of log data. Re-transmitting units 304 and 308 of log data can occur sequentially.

Figure 4:
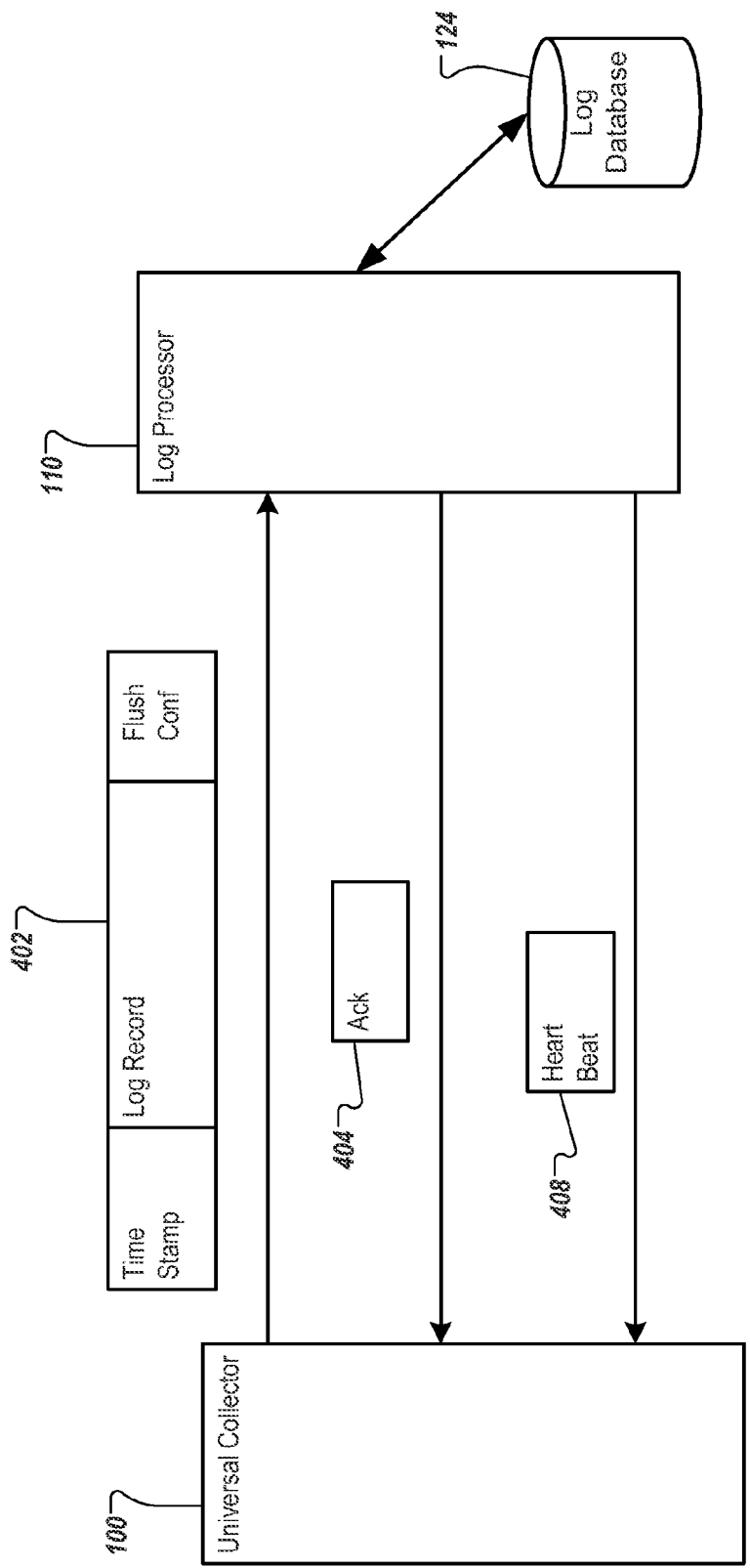
FIG. 4 is a block diagram illustrating communication between a universal data collector and a log processor.

FIG. 4 is a block diagram illustrating communication between universal data collector 100 and log processor 110. Log processor 110 can receive unit 402 of log data transmitted from universal data collector 100. Unit 402 of log data can include one or more log records, a timestamp of each log record, and a request for confirmation. A log record can include an original timestamp indicating a time when an event recorded by the log record occurred. Log processor 110 can parse the log record to retrieve the original timestamp. When the log record is transmitted real-time from a log producer to universal data collector 100 and to log processor 110, the time at which log processor 110 receives the log record can be used as an estimate of the time the event occurred, avoiding parsing the log record, or coping with log records which do not include times. When the log record is buffered by universal data collector 100, universal data collector 100 can associate the original timestamp of the log record to the log record externally, such that log processor 110 can use the associated timestamp as an estimate of the time the event occurred, while still avoiding having to parse the log record.

Log processor 110 can additionally or alternatively use the associated timestamp to ensure that when log processor 110 receives re-transmitted data, log processor 110 can determine whether the re-transmitted data are redundant. Re-transmitted data can be redundant when log processor 110 sends out an acknowledgment confirming safe reception and storage of data but the acknowledgment is not received by universal data collector 100.

Unit 402 of log data can also be associated with flush control information. The flush control information can indicate to log processor 110 that acknowledgment 122 will be sent. The flush control information can be used to inform log processor 110 the granularity of log data at which acknowledgment 122 is sent. For example, the flush control information can indicate that log processor 110 is to send acknowledgment 122 for each log record received. Alternatively, the flush control information can indicate that instead of sending acknowledgment 122 for every log record, log processor 110 is to send acknowledgment 122 per unit of log data, which can include a set of log records. Acknowledgement 122 can be sent when the unit of log data is stored in log database 124.

Log processor 110 can send heart beat indicator 408 to various components of a UCF. Heart beat indicator 408 can include information on the health, or performance, of log processor 110. For example, heart beat indicator 408 can include information indicating a load of log processor 110. Universal data collector 100 or a universal collection manager can receive heart beat indicator 408 and determine, based on the included information, a size of an adaptive buffer to store log data.

Figure 5:
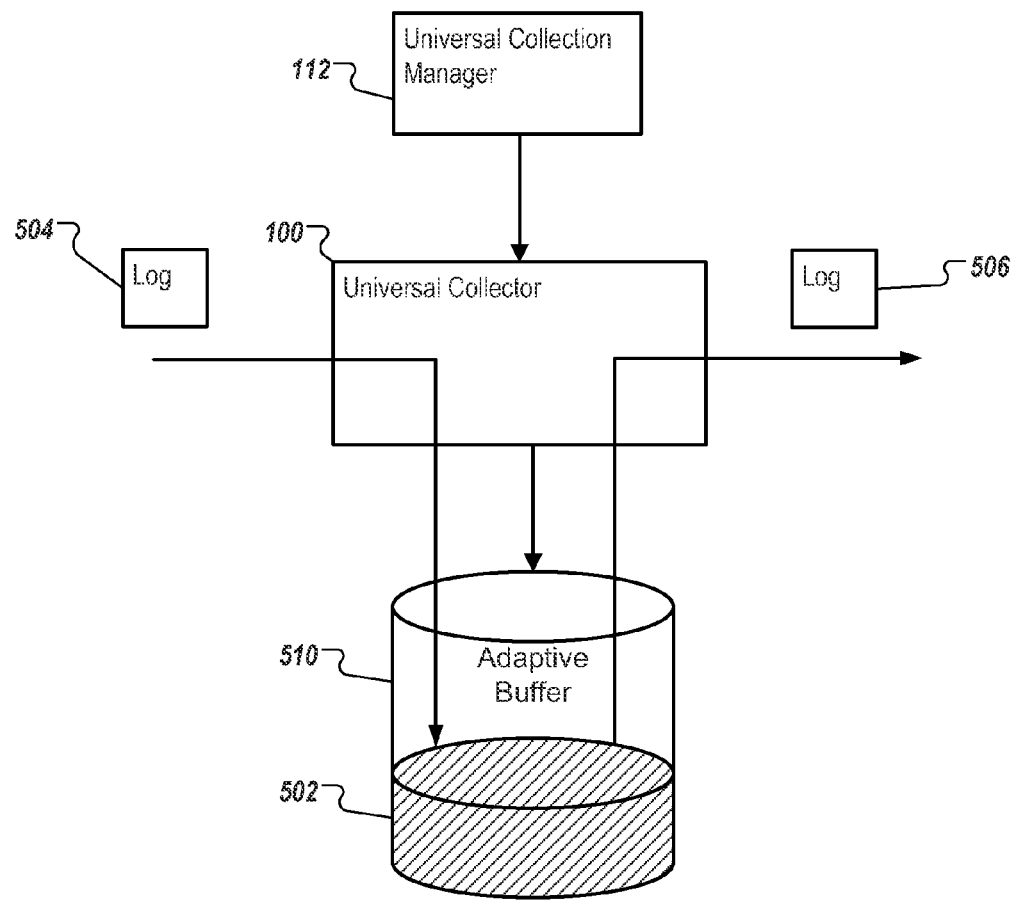
FIG. 5 is a block diagram illustrating an exemplary adaptive data buffer.

FIG. 5 is a block diagram illustrating an exemplary adaptive data buffer. Universal data collector 100 can include, be coupled with, or be connected to adaptive buffer 502. Log data 504, received from one or more log producers, can be stored in adaptive buffer 502 under various circumstances. Universal data collector 100 can retrieve log data stored in adaptive buffer 502 and send data 506 to a log processor. Data 506 can include log data 504, timestamps, and flush control information.

Adaptive buffer 502 can have a size that can be modified based on various parameters. For example, universal collection manager 112 can determine that a log processor will be unable to process log data for an extended period of time. A large amount of log data will need to be buffered. Universal collection manager 112 can notify universal data collector 100 of the need. Accordingly, universal data collector 100 can allocate extra storage space 510 to adaptive buffer 502. When the need no longer exists, universal data collector 100 can reallocate extra storage space 510 for other uses.

Exemplary Versioning

Figure 6A:
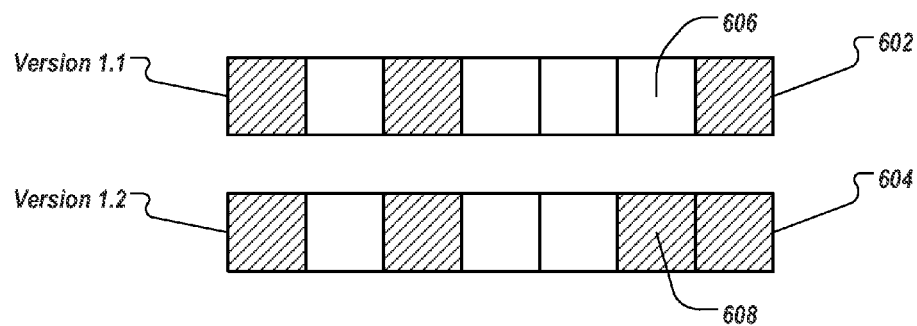
FIGS. 6A and 6B are graphs illustrating exemplary version control techniques used in adaptive data transmission.
Figure 6B:
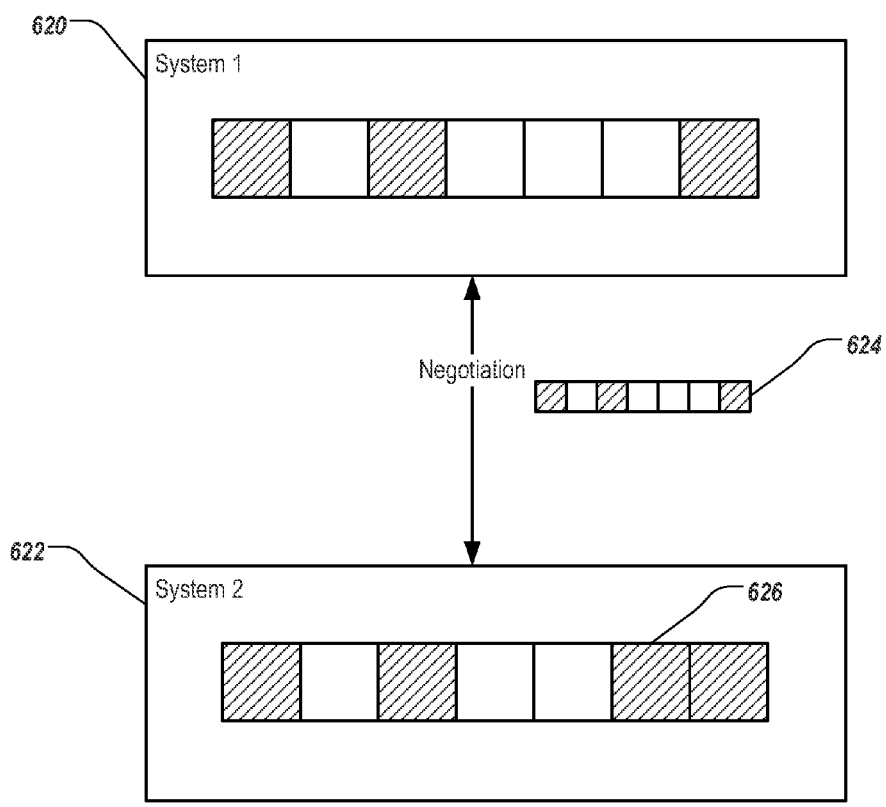

FIGS. 6A and 6B are graphs illustrating exemplary versioning techniques used in adaptive data transmission. FIG. 6A illustrates feature bitmap representation of features of multiple versions of protocols used in adaptive data transmission. Adaptive data transmission can be implemented using instructions, or computer software, and hardware devices. Different versions of the computer software can include different features. Each version of the computer software can include a version number and a data structure associated with the version number. The data structure can include a bitmap in which each bit corresponds to a feature or protocol option.

Exemplary feature bitmap 602 can correspond to a first version (e.g., version 1.1) of the adaptive data transmission software. Exemplary feature bitmap 604 can correspond to a second version (e.g., version 1.2) of the adaptive data transmission software. Each bit of feature bitmaps 602 and 604 can be set to 1 (as indicated in a shaded box) or 0 (as indicated in an empty box). Version 1.2 of the adaptive data transmission software differs from version 1.1 in that version 1.2 provides an additional feature. Bits 606 and 608 can represent, respectively, bits in feature bitmaps 602 and 604 that correspond to the feature.

FIG. 6B illustrates a negotiation between two systems using feature bitmaps. First system 620 can communicate with second system 622. Each of systems 620 and 622 can include a log producer, a universal data collector, a universal collection manager, a log processor, or any combination of the above. First system 620 can include a first version of adaptive data transmission software. Second system 622 can include a second version of adaptive data transmission software. During data communication between first system 620 and second system 622, first system 620 can be a system that initiates the communication. First system 620 can send feature bitmap 624 to second system 622. Feature bitmap 624 can be a feature bitmap corresponding to the first version of adaptive data transmission software. Second system 622, upon receiving feature bitmap 624, can compare feature bitmap 624 with feature bitmap 626, which can be a feature bitmap corresponding to the second version of adaptive data transmission software.

When feature bitmap 624 matches feature bitmap 626, the data communication can begin. When feature bitmap 624 does not feature bitmap 626, second system 622 can determine if second system 622 can handle data provided using the first version of adaptive data transmission software. If the data can be processed, the data communication can begin. If the data cannot be processed, second system 622 can reply by sending feature bitmap 626 to first system 620. Upon receiving feature bitmap 626, first system 620 can examine feature bitmap 626 and determine (1) whether one or more features enabled according to bitmap 624 can be disabled when communicating with second system 622; or (2) if no feature can be disabled, whether to start the data communication to another system or to report an error to a universal collection manager.

Exemplary Processes of Adaptive Data Transmission

Figure 7:
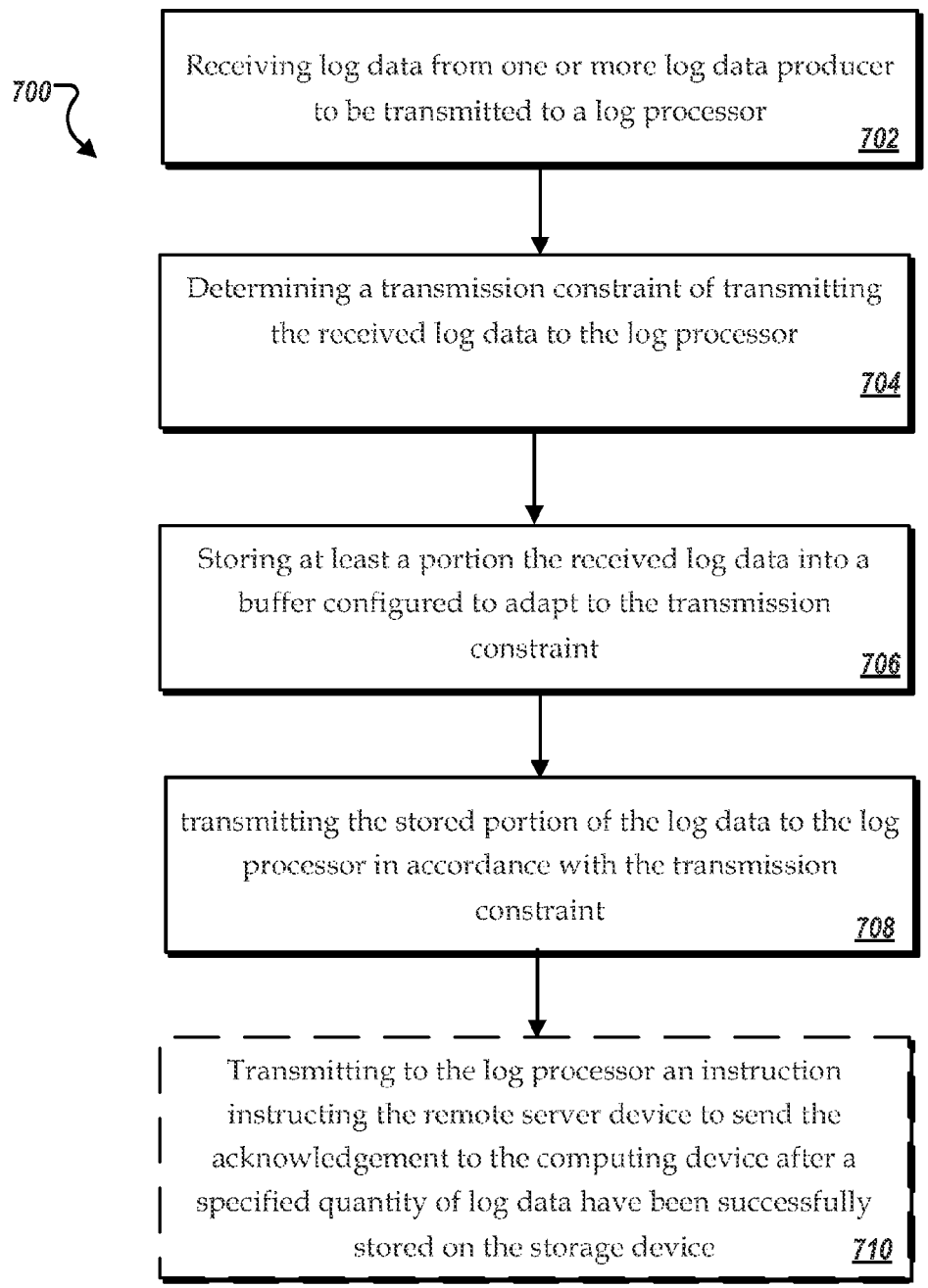
FIG. 7 is a flowchart illustrating an exemplary process of adaptive data transmission techniques.

FIG. 7 is a flowchart illustrating exemplary process 700 of adaptive data transmission techniques. For convenience, process 700 will be described in reference to a system implementing process 700. The system can include universal data collector 100 as described above.

The system can receive (702) log data from one or more log producers to be transmitted to a log processor. Receiving log data from the one or more log producers can include receiving log data from one or more log producing devices, operating systems, or applications through a first network. The first network can include a LAN.

The system can determine (704) a transmission constraint of transmitting the received log data to the log processor. Determining the transmission constraint includes determining an available network bandwidth of a second network for transmitting the log data. The second network can be a communications network through which the system can communicate with the log processor. The second network (e.g., a WAN) can be less secure, reliable, or fast than the first network.

In some implementations, determining (704) the transmission constraint of transmitting the received log data to the log processor can include determining a reliability of the log processor. Determining the reliability of the log processor can include receiving an acknowledgement from the log processor. The acknowledgment indicating that prior-transmitted log data have been successfully stored on a storage device. Transmitting the stored portion of the log data to the log processor includes transmitting the stored portion of the log data before receiving the acknowledgement. In some implementations, determining the reliability of the log processor can include receiving a heart beat signal from the log processor. The heart beat signal can indicate that the log processor is capable of receiving and processing transmitted log data.

The system can store (706) at least a portion of the received log data into a buffer configured to adapt to the transmission constraint. Storing the received log data into the buffer configured to adapt to the transmission constraint can include storing the portion of the log data such that other portions of the log data are transmitted to the log processor using the available network bandwidth. The buffer can be configured to have a size that is dynamically determined based on a rate of receiving the log data and the available network bandwidth.

The size can increase or decrease according to the receiving of the log data and the available network bandwidth.

The system can transmit (708) the stored portion of the log data to the log processor in accordance with the transmission constraint. Transmitting the stored log data to the log processor can include transmitting the stored log data to a remote log processor through a second network. The second network can include a WAN. Transmitting the stored portion of the log data to the log processor in accordance with the transmission constraint can include delaying transmitting the stored portion of the log data to the log processor until the available network bandwidth permits the stored portion of the log data to be transmitted. In some implementations, transmitting the stored portion of the log data to the log processor in accordance with the transmission constraint can include delaying transmitting the stored portion of the log data to the log processor until the computing device receives a signal from the log processor indicating that the log processor is capable of receiving and processing transmitted log data. The signal can include an indication that the transmitted log data are committed to a storage device. In some implementations, transmitting the stored portion of the log data to the log processor includes transmitting information (e.g., a timestamp) indicating that the stored portion of the log data has been stored for a period of time.

Optionally, the system can transmit (710) to the log processor an instruction instructing the remote server device to send the acknowledgement to the computing device after a specified quantity of log data have been successfully stored on the storage device.

Figure 8:
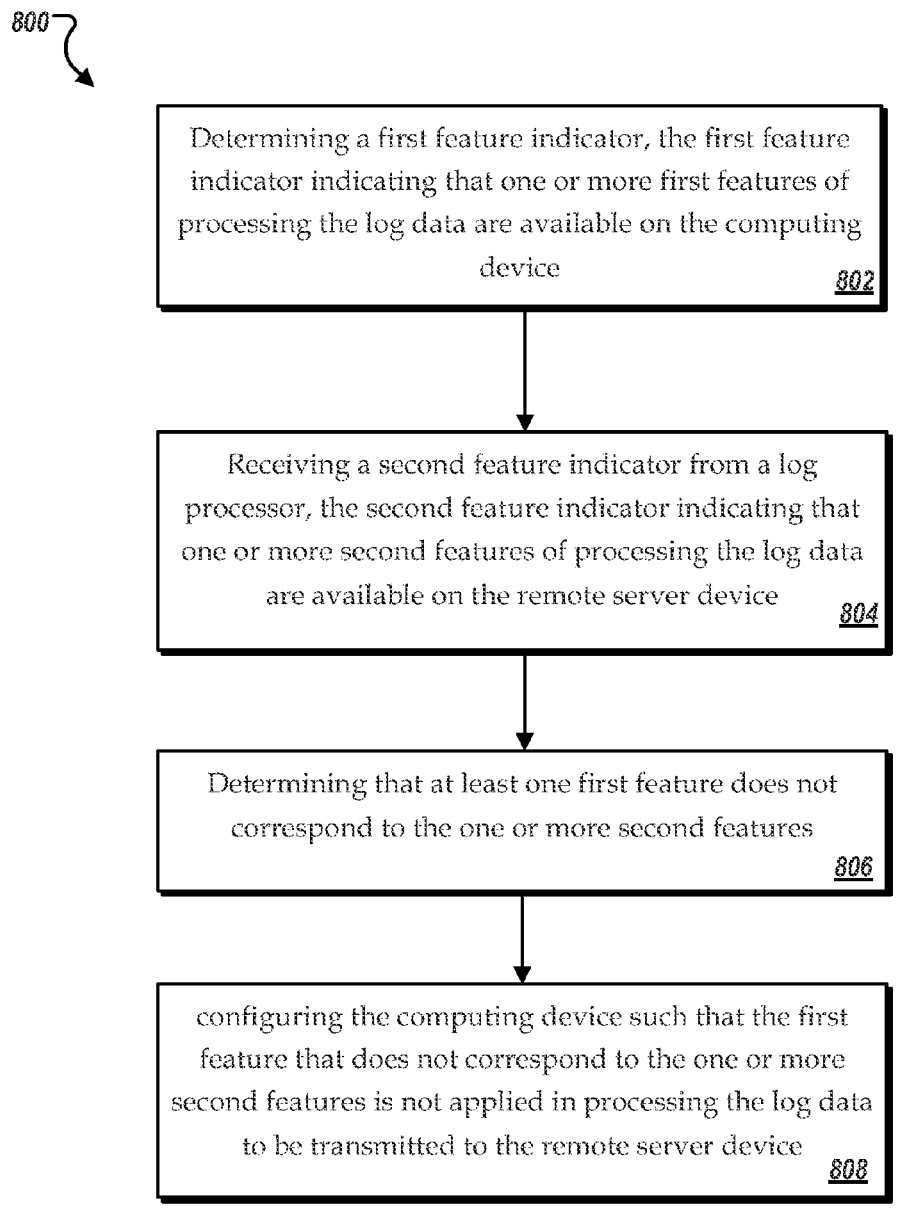
FIG. 8 is a flowchart illustrating exemplary processes of the version control techniques used in adaptive data transmission.

FIG. 8 is a flowchart illustrating exemplary processes 800 of the version control techniques used in adaptive data transmission. For convenience, process 800 will be described in reference to a system implementing process 800.

The system can determine (802) a first feature indicator, the first feature indicator indicating that one or more first features of processing the log data are available on the computing device. The first features can be associated with a version of software installed on the system or a set of hardware of the system. The first features can be represented in a bitmap data structure.

The system can receive (804) a second feature indicator from a log processor. The second feature indicator can indicate that one or more second features of processing the log data are available on a second system (e.g., a log processor).

The system can determine (806) that at least one first feature does not correspond to the one or more second features. Determining that at least one first feature does not correspond to the one or more second features can include comparing the bitmaps representing respective features and identifying a difference in the bitmaps.

The system can configure (808) the system such that the first feature that does not correspond to the one or more second features is not applied in processing the log data to be transmitted to the log processor.

Exemplary System Architecture

Figure 9:
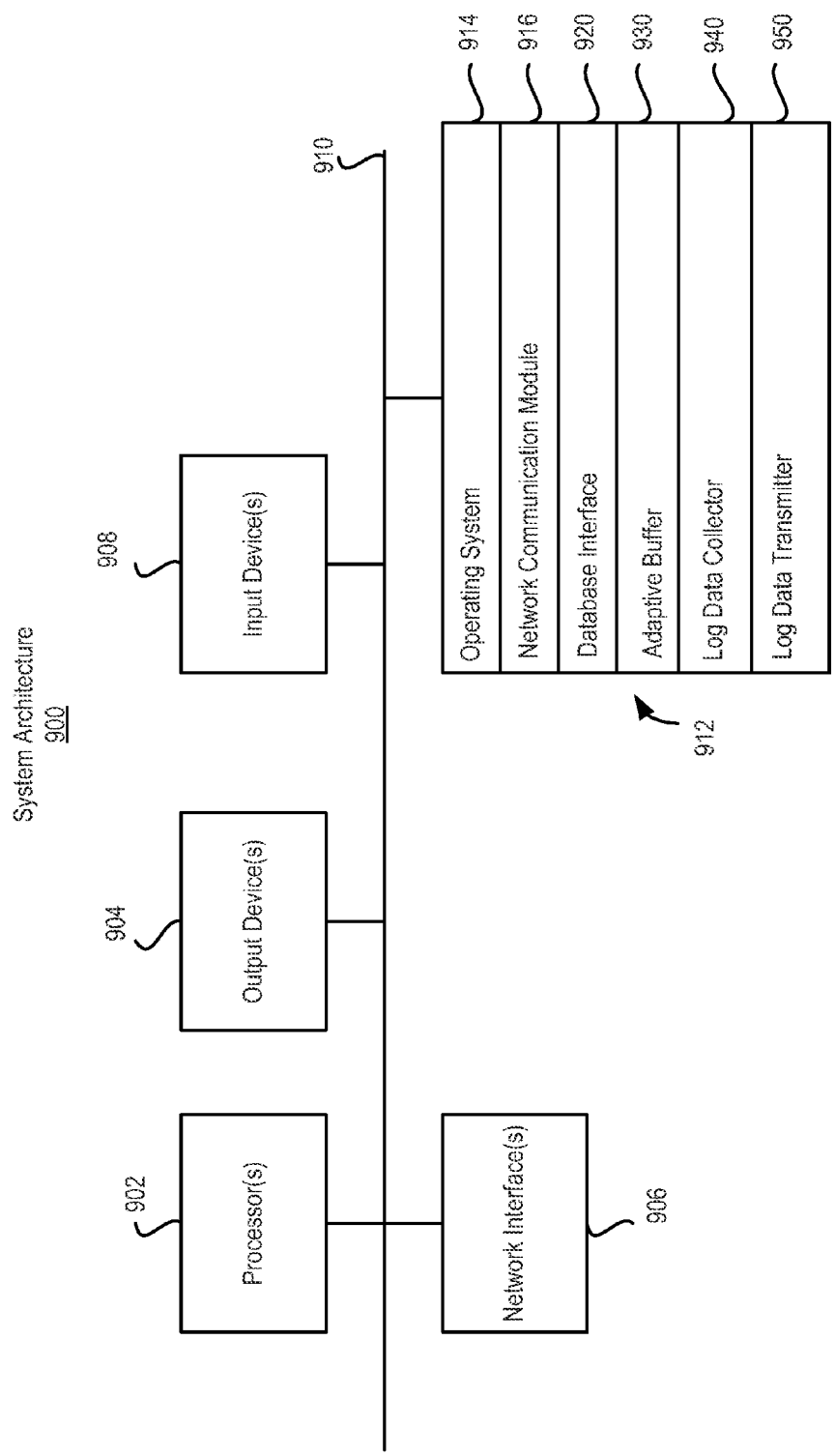
FIG. 9 is a block diagram of an exemplary system architecture for implementing the adaptive data transmission features and operations.

FIG. 9 is a block diagram of an exemplary system architecture 900 for implementing the features and operations of adaptive data transmission techniques. Other architectures are possible, including architectures with more or fewer components. In some implementations, architecture 900 includes one or more processors 902 (e.g., dual-core Intel® Xeon® Processors), one or more output devices 904 (e.g., LCD), one or more network interfaces 906, one or more input devices 908 (e.g., mouse, keyboard, touch-sensitive display) and one or more computer-readable mediums 912 (e.g., RAM, ROM, SDRAM, hard disk, optical disk, flash memory, etc.). These components can exchange communications and data over one or more communication channels 910 (e.g., buses), which can utilize various hardware and software for facilitating the transfer of data and control signals between components.

The term "computer-readable medium" refers to any medium that participates in providing instructions to processor 902 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 912 can further include operating system 914 (e.g., Mac OS® server, Windows® NT server), network communication module 916, database interface 920, adaptive buffer 930, log data collector 940, and log data transmitter 950. Database interface 920 can provide one or more interfaces between a universal data collector and a data store storing buffered log data. Adaptive buffer 930 can be utilized to store the buffered log data. Log data collector 940 can include a universal data collector as described above. Log data transmitter 950 can include an interface to a log processor for transmitting data to the log processor.

Operating system 914 can be multi-user, multiprocessing, multitasking, multithreading, real time, etc. Operating system 914 performs basic tasks, including but not limited to: recognizing input from and providing output to devices 904 and 908; keeping track and managing files and directories on computer-readable mediums 912 (e.g., memory or a storage device); controlling peripheral devices; and managing traffic on the one or more communication channels 910. Network communications module 916 includes various components for establishing and maintaining network connections (e.g., software for implementing communication protocols, such as TCP/IP, HTTP, etc.). Database interface 920 can include interface to various databases including relational databases.

Architecture 900 can be included in any device capable of hosting a database application program. Architecture 900 can be implemented in a parallel processing or peer-to-peer infrastructure or on a single device with one or more processors. Software can include multiple software components or can be a single body of code.

The described features can be implemented advantageously in one or more computer program products that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or plasma monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, log data are described. Adaptive data transmission techniques can be used to transmit data other than log data. For example, stock price data, news, electronic mail, and audio and video content can be transmitted using the techniques described. Accordingly, other implementations are within the scope of the following claims.

What is claimed is:

1. A method, comprising:
receiving, by a data collector comprising one or more computer processors, log data from one or more log producers to be transmitted to a log processor through a communications network, the log processor being configured to provide an acknowledgement to the data collector for each unit of log data received from the data collector;
subject to a transmission constraint of transmitting the received log data to the log processor, transmitting, by the data collector, a first portion of the received log data to the log processor and storing, by the data collector, a second portion of the received log data into a buffer configured to adapt to the transmission constraint, the transmission constraint including:
a first threshold on bandwidth usage and a second threshold on log processor response time; and
rules on adapting a size of the buffer or computing resources allocated to the log processor when the thresholds are reached; and adapting the data collector or the log processor for transmitting the stored portion of the log data to the log processor in accordance with the rules in the transmission constraint, including:
upon determining, by a collection manager comprising one or more computer processors, that a bandwidth utilization rate of the communication network reached the first threshold, instructing, by the collection manager, the data collector to adapt to the bandwidth utilization rate by increasing the size of the buffer, increasing the size of the buffer including allocating additional storage space for the buffer wherein, when the bandwidth utilization rate no longer reaches the first threshold, the additional storage space is reallocated for other uses, and wherein determining that the bandwidth utilization rate reached the first threshold comprises determining, by the collection manager, that traffic of transmitting the first portion of the received log data from the data collector to the log processor has been utilizing full available bandwidth of the communication network for a given period of time; and
upon determining, by the collection manager, that a promptness for providing the acknowledgement by the log processor satisfies the second threshold, configuring the log processor to allocate more computing resources to process log data transmitted from the data collector.

2. The method of claim 1, wherein:
receiving log data from the one or more log producers includes receiving log data from one or more log producing devices through a local area network (LAN); and
the communications network between the data collector and the log processor includes a wide area network (WAN).

3. The method of claim 1, wherein:
the data collector organizes the received log data into units and enters the units into a queue stored in the buffer;
transmitting the stored portion of the log data to the log processor includes transmitting units of log data stored in the queue sequentially; and
the data collector removes a first unit of log data from the queue upon receiving an acknowledgement from the log processor that the first unit of log data has been processed.

4. The method of claim 3, wherein transmitting the stored portion of the log data to the log processor includes retransmitting a second unit of log data upon determining that, after a specified threshold length of time, an acknowledgement that the second unit of log data has been processed has not been received.

5. The method of claim 1, wherein adapting the data collector for transmitting the stored portion of the log data to the log processor includes storing a first portion of the stored log data on the data collector such that a second portion of the stored log data is transmitted to the log processor using available network bandwidth.

6. The method of claim 1, wherein increasing the size of the buffer causes a reduction in the bandwidth utilization rate by reducing transmission of the first portion of the log data and increasing storage of the second portion of the log data.

7. A non-transitory storage device storing a computer program product, the computer program product, when executed, operable to cause a data collector and a collection manager each comprising one or more processors to perform operations comprising:

receiving, by the data collector, log data from one or more log producers to be transmitted to a log processor through a communications network, the log processor being configured to provide an acknowledgement to the data collector for each unit of log data received from the data collector;

subject to a transmission constraint of transmitting the received log data to the log processor, transmitting, by the data collector, a first portion of the received log data to the log processor and storing, by the data collector, a second portion the received log data into a buffer configured to adapt to the transmission constraint, the transmission constraint including:
  a first threshold on bandwidth usage and a second threshold on log processor response time; and
  rules on adapting a size of the buffer or computing resources allocated to the log processor when the thresholds are reached; and adapting the data collector or the log processor for transmitting the stored portion of the log data to the log processor in accordance with the rules in the transmission constraint, including:
  upon determining, by the collection manager, that a bandwidth utilization rate of the communication network reached the first threshold, instructing, by the collection manager, the data collector to adapt to the bandwidth utilization rate by increasing the size of the buffer, increasing the size of the buffer including allocating additional storage space for the buffer wherein, when the bandwidth utilization rate no longer reaches the first threshold, the additional storage space is reallocated for other uses, and wherein determining that the bandwidth utilization rate reached the first threshold comprises determining, by the collection manager, that traffic of transmitting the first portion of the received log data from the data collector to the log processor has been utilizing full available bandwidth of the communication network for a given period of time; and
  upon determining, by the collection manager, that a promptness for providing the acknowledgement by the log processor satisfies the second threshold, configuring the log processor to allocate more computing resources to process log data transmitted from the data collector.

8. The non-transitory storage device of claim 7, wherein:
receiving log data from the one or more log producers includes receiving log data from one or more log producing devices through a local area network (LAN); and
the communications network between the data collector and the log processor includes a wide area network (WAN).

9. The non-transitory storage device of claim 7, wherein:
the data collector organizes the received log data into units and enters the units into a queue stored in the buffer;
transmitting the stored portion of the log data to the log processor includes transmitting units of log data stored in the queue sequentially; and
the data collector removes a first unit of log data from the queue upon receiving an acknowledgement from the log processor that the first unit of log data has been processed.

10. The non-transitory storage device of claim 9, wherein transmitting the stored portion log data to the log processor includes retransmitting a second unit of log data upon determining that, after a specified threshold length of time, an acknowledgement that the second unit of log data has been processed has not been received.

11. The non-transitory storage device of claim 7, wherein adapting the data collector for transmitting the stored portion of the log data to the log processor includes storing a first portion of the stored log data on the data collector such that a second portion of the stored log data is transmitted to the log processor using available network bandwidth.

12. The non-transitory storage device of claim 11, wherein transmitting the stored portion of the log data to the log processor includes transmitting the stored portion of the log data before receiving an acknowledgement.

13. The non-transitory storage device of claim 11, the operations further comprising transmitting to the log processor an instruction instructing the log processor to send the acknowledgement to the data collector after a specified quantity of log data have been successfully stored in the buffer.

14. The non-transitory storage device of claim 7, wherein increasing the size of the buffer causes a reduction in the bandwidth utilization rate by reducing transmission of the first portion of the log data and increasing storage of the second portion of the log data.

15. A system comprising:
a data collector and a collection manager each comprising one or more computer processors; and
a non-transitory storage device storing a computer program product, the computer program product, when executed, operable to cause the data collector and collection manager to perform operations comprising:
  receiving, by the data collector, log data from one or more log producers to be transmitted to a log processor through a communications network, the log processor being configured to provide an acknowledgement to the data collector for each unit of log data received from the data collector;
  subject to a transmission constraint of transmitting the received log data to the log processor, transmitting, by the data collector, a first portion of the received log data to the log processor and storing, by the data collector, a second portion the received log data into a buffer configured to adapt to the transmission constraint, the transmission constraint including:
  a first threshold on bandwidth usage and a second threshold on log processor response time; and
  rules on adapting a size of the buffer or computing resources allocated to the log processor when the thresholds are reached; and
  adapting the data collector or the log processor for transmitting the stored portion of the log data to the log processor in accordance with the rules in the transmission constraint, including:
  upon determining, by the collection manager, that a bandwidth utilization rate of the communication network reached the first threshold, instructing, by the collection manager, the data collector to adapt to the bandwidth utilization rate by increasing the size of the buffer, increasing the size of the buffer including allocating additional storage space for the buffer wherein, when the bandwidth utilization rate no longer reaches the first threshold, the additional storage space is reallocated for other uses, and wherein determining that the bandwidth utilization rate reached the first threshold comprises determining, by the collection manager, that traffic of transmitting the first portion of the received log data from the data collector to the log processor has been utilizing full available bandwidth of the communication network for a given period of time; and upon determining, by the collection manager, that a promptness for providing the acknowledgement by the log processor satisfies the second threshold, configuring the log processor to allocate more computing resources to process log data transmitted from the data collector.

16. The system of claim 15, wherein:

receiving log data from the one or more log producers includes receiving log data from one or more log producing devices through a local area network (LAN); and the communications network between the data collector and the log processor includes a wide area network (WAN).

17. The system of claim 15, wherein:

the data collector organizes the received log data into units and enters the units into a queue stored in the buffer;

transmitting the stored portion of the log data to the log processor includes transmitting units of log data stored in the queue sequentially; and the data collector removes a first unit of log data from the queue upon receiving an acknowledgement from the log processor that the first unit of log data has been processed.

18. The system of claim 17, wherein transmitting the stored portion of the log data to the log processor includes retransmitting a second unit of log data upon determining that, after a specified threshold length of time, an acknowledgement that the second unit of log data has been processed has not been received.

19. The system of claim 15, the operations further comprising:

determining a first feature indicator, the first feature indicator indicating that one or more first features of processing the log data are available on the data collector;

receiving a second feature indicator from the log processor, the second feature indicator indicating that one or more second features of processing the log data are available on the log processor;

determining that at least one first feature does not correspond to the one or more second features; and configuring the data collector such that the first feature that does not correspond to the one or more second features is not applied in processing the log data to be transmitted to the log processor.

20. The system of claim 15, wherein increasing the size of the buffer causes a reduction in the bandwidth utilization rate by reducing transmission of the first portion of the log data and increasing storage of the second portion of the log data.

* * * * *